Patented Dec. 15, 1942

2,304,791

UNITED STATES PATENT OFFICE 2,304,791

PREVENTING PRECIPITATION OF METALLIC COMPOUNDS FROM SOLUTION

Edward B. Bell, Lowell, Mass., assignor to Hall Laboratories, Inc., Pittsburgh, Pa., a corporation of Pennsylvania No Drawing. Application April 22, 1939, Serial No. 269,417

7 Claims. (Cl. 8—140)

This invention relates generally to a process of preventing precipitation of metallic compounds from solution and more particularly to the use of alkali-metal metaphosphates, tripolyphosphates, and pyrophosphates for preventing or retarding the precipitation of the metallic compounds from solution. It also relates to wool carbonizing baths, the invention being particularly applicable to the treatment of such baths.

In the treatment of wool, it is customary to pass it through a "carbonizing" bath of dilute sulphuric acid of about 5% strength, in order to remove from the wool all cotton, leaf, and burrs that may be present in the woolen fabric as impurities. The acid bath is usually at room temperature and the wool is passed through it at speeds of 6 to 27 yards per minute for piece goods. During the carbonizing process, lime salts or soaps in the wool are acted upon by the acid bringing the calcium into solution. Sulphuric acid of 4.87% strength will keep in solution 2.73 grams of calcium sulphate $$(CaSO_4.2H_2O)$$

per liter at 25° C. This is the equivalent of 2727 P. P. M. of calcium sulphate $(CaSO_4.2H_2O)$ or 635 P. P. M. of calcium (Ca). The introduction of calcium beyond this saturation point causes it to precipitate out from the solution as calcium sulphate $(CaSO_4)$ collecting on the walls of the container and the rolls used for passing the wool through the bath. In some instances, the strength of the acid bath is controlled electrically and this involves the use of electrodes immersed in the bath. It has been found that after a time the electrodes are covered by a deposit of crystalline nature which interferes with their proper functioning.

I have found that carbonizing baths and the electrodes which are sometimes employed therein may be kept clean from the objectionable precipitates referred to by adding to the bath a very small amount of an alkali-metal metaphosphate, for example sodium hexametaphosphate. In this way, the baths and equipment containing the same may be maintained clean almost indefinitely, whereas previous to my discovery it was necessary to change the baths at intervals of from three days to three weeks, depending upon the condition of the water, the lime content, and amount of wool treated.

The optimum amount of sodium hexametaphosphate or other alkali-metal metaphosphate required for preventing or retarding the precipitation of calcium sulphate from carbonizing baths may vary according to the particular conditions but the amount of metaphosphate is always substantially less than would be required to react stoichiometrically with the calcium in the bath. It is generally between 50 and 1000 P. P. M. and preferably between 50 and 400 P. P. M. I have found that in a sulphuric acid bath of 5% strength containing about 5000 P. P. M. of calcium the optimum amount of sodium hexametaphosphate is about 300-400 P. P. M. Even 25 P. P. M. of the sodium metaphosphate appreciably retarded the precipitation of calcium sulphate and 50-100-200 P. P. M. of metaphosphate decreased the rate of precipitation as the amount of metaphosphate was increased.

In another series of tests, a 5% solution of sulphuric acid contained 2500 P. P. M. calcium. To this solution were added quantities of sodium hexametaphosphate from 100 P. P. M. to 1,000 P. P. M., varying in the amount of 100 P. P. M. of the metaphosphate for each sample. It was found that 200 P. P. M. of the metaphosphate was the optimum quantity for the amount of calcium contained in the sulphuric acid solution. All of the samples containing the metaphosphate were free of any precipitate after one hour, whereas the calcium sulphate precipitated immediately in the sample containing no metaphosphate. After standing 32 hours, the sample containing 200 P. P. M. metaphosphate had the least deposit of any, the deposit gradually increasing in amount as the metaphosphate increased from 300 P. P. M. to 1000 P. P. M. The deposit from the sample containing 100 P. P. M. metaphosphate was comparable to that containing 900 P. P. M. metaphosphate. It will be seen, therefore, that in this series of tests there was a critical amount of metaphosphate (about 200 P. P. M.) both below and above which the metaphosphate is less effective. It will also be seen that the 200 P. P. M. of sodium metaphosphate is only a small fraction of the amount which would be required to react stoichiometrically with the 2500 P. P. M. of calcium in the sulphuric acid solution. The stoichiometric amount for this calcium concentration would be about 26,000 P. P. M. of sodium hexametaphosphate, 665 P. P. M. of calcium (Ca) being held in solution by the acid itself.

In order that the data above referred to may be readily available to the operator of a carbonizing bath, the following information is given. For a carbonizing bath of 500 gallons of 5% sulphuric acid, 50 P. P. M. of sodium hexametaphosphate or 3.25 ounces, would prevent the precipitation of calcium sulphate from a bath containing 1000 P. P. M. of calcium. Assuming that 600 pounds per hour of wool goes through the carbonizer, and assuming that the wool contains .5% calcium soap, there would be introduced into the bath three pounds of calcium soap per hour or 125 P. P. M. of calcium per hour. In order to prevent the precipitation of calcium sulphate from such a bath, the operator should add one to two pints of a 30% sodium hexametaphosphate solution at the beginning of the operation and should add one to two pints of the solution every eight hours. One pint of the 30% solution corresponds to 75 P. P. M. on the sulphuric acid bath. The amount of sodium hexametaphosphate which would be required to act stoichiometrically with the calcium present in the bath under the conditions referred to would be in the neighborhood of 7500 P. P. M., the acid solution holding 665 P. P. M. in solution. It is thus seen that in the present invention only a small fraction of the stoichiometric amount of metaphosphate is employed.

Although the invention is particularly useful in preventing calcium sulphate precipitation in acid carbonizing baths, it may be employed in preventing or retarding precipitation of calcium sulphate under other conditions or preventing or retarding the precipitation of other metallic compounds.

Another example of the prevention of calcium sulphate precipitates is shown by the following tests. Solutions were made up containing 2.0 grams $Na_2SO_4$ (anhydrous) per 100 ml. and sodium hexametaphosphate added to the different solutions in the amounts of 200–400–600 P. P. M. Calcium in the amount of 5000 P. P. M. was then added to each of the solutions. A blank containing the other ingredients but not sodium hexametaphosphate was also prepared. At first all of the solutions were clear but gradually the blank started to form crystals of calcium sulphate, which became quite heavy, whereas all of the solutions containing the sodium hexametaphosphate remained clear.

Small amounts of sodium metaphosphate will prevent the precipitation of calcium sulphite from solutions as shown by the following example:

25 ml. of $Ca(OH)_2$—1.615 mg. per ml.— was added to each of six Nessler tubes. To each tube was added 5, 10, 20, 30 or 40 P. P. M. of sodium metaphosphate, one tube being used as a blank. A saturated solution of $Na_2SO_3$ was then added to bring the total volume to 50 ml.

After two minutes, the blank showed evidence of a crystalline precipitate, this being closely followed by the samples containing 5 and 10 P. P. M. of metaphosphate. The tubes containing 20, 30 and 40 P. P. M. of metaphosphate remained clear even after standing for 24 hours.

Sodium hexametaphosphate $(NaPO_3)_6$, sodium tripolyphosphate $(Na_5P_3O_{10})$, and sodium pyrophosphate $(Na_4P_2O_7)$ will prevent or retard the precipitation of ferric hydroxide $Fe(OH)_3$. In carrying out these tests, solutions were made up containing 50 P. P. M. of ferric sulphate crystals. These were made sufficiently acid with sulphuric acid to insure all salt being in solution. Sodium hexametaphosphate in amounts of 5–10–20–30 P. P. M. was added and the pH gradually raised to 12.3 with sodium hydroxide solution. The solutions containing the sodium hexametaphosphate showed a definite tendency to retard the precipitation of $Fe(OH)_3$. The sample containing 30 P. P. M. of sodium metaphosphate did not precipitate until a pH of 12.0 was reached and after standing for ¾ of an hour.

A series of samples similar to that just described except containing 200 P. P. M. of ferric sulphate crystals also was prepared and to the samples were added 25–50–100–200 P. P. M. of sodium hexametaphosphate, sodium pyrophosphate, and sodium tripolyphosphate respectively. It was found that all of these phosphates retarded the precipitation of ferric hydroxide. The optimum amounts were 50 P. P. M. sodium hexametaphosphate, 100 P. P. M. sodium pyrophosphate, and 100 P. P. M. sodium tripolyphosphate.

Zinc sulfide precipitate 100 ml. solutions were made up with 1000 P. P. M. of $ZnSO_4.7H_2O$ containing 0–100–150–200 P. P. M. of sodium hexametaphosphate. 10 ml. of $Na_2S$ (1%) was added and the blank precipitated immediately. The solution containing 200 P. P. M. of sodium hexametaphosphate was clear and the other two faintly turbid. When allowed to stand over night the solution containing 200 P. P. M. of sodium hexametaphosphate was slightly turbid but no precipitate had settled on the bottom whereas the blank had a precipitate ⅛ inch in depth. This illustrates the effect of sodium hexametaphosphate in retarding the precipitation of zinc as zinc sulfide. Similar tests using sodium pyrophosphate and sodium tripolyphosphate showed that the tripolyphosphate was effective but that the pyrophosphate was ineffective in preventing or retarding the precipitation of zinc as zinc sulfide. The sodium hexametaphosphate was more effective than the sodium tripolyphosphate.

Barium carbonate precipitate 100 ml. solutions containing 2,000 P. P. M. of barium chloride and 5 ml. of dilute hydrochloric acid were made up. Sodium hexametaphosphate in amounts of 0–10–20–30 P. P. M. were added to the respective solutions and then 20 ml. of a 1% sodium carbonate solution was added. The sample containing no sodium hexametaphosphate precipitated immediately as a fine crystalline precipitate. The samples containing the metaphosphate precipitated only slightly but all held up as a dispersion. After one hour, the sample containing no sodium hexametaphosphate had a precipitate about 16 times greater than that of the samples containing 20–30 P. P. M. of metaphosphate.

Barium sulphate precipitate 100 ml. solutions of 2500 P. P. M. barium chloride were made up and dilute hydrochloric acid added. Sodium hexametaphosphate was then added in the amounts of 0–500–700–900 P. P. M. respectively. The precipitant, 2 ml. of dilute sulphuric acid, was finally added to each solution. The blank precipitated at once but the metaphosphate solution containing 900 P. P. M. was clear. The other two solutions showed only a trace of precipitation.

Lead sulphate precipitate 100 ml. solutions were made with .1% sulphuric acid with additions of 0–25–50–100–200–300–400–500 P. P. M. sodium hexametaphosphate respectively. 5 ml. of a lead nitrate solution (1%) or 500 P. P. M. was added. The blank precipitated as a crystalline precipitate immediately. The solution with 25 P. P. M. metaphosphate also came down in a similar condition but not quite as heavily as the blank solution. The solution containing 500 P. P. M. metaphosphate was clear with no turbidity or precipitate. The sample with 400 P. P. M. had a slight turbidity but no precipitate. The samples containing respectively 50-100-200-300 P. P. M. metaphosphate showed a light crystalline precipitate very much less than the blank and of these solutions the one containing 50 P. P. M. of metaphosphate showed the greatest effect in retarding the precipitation. The tests showed definitely that the precipitation of lead sulphate is retarded or prevented by the metaphosphate.

In considering the precipitation of ferric hydroxide from alkaline solutions, we have shown that either sodium metaphosphate, sodium tripolyphosphate, or sodium pyrophosphate is effective in preventing or retarding the formation of the precipitate. These three phosphates are referred to herein as "molecularly dehydrated phosphates." These phosphates may be considered as molecularly dehydrated forms of the ortho salts and acids, since dehydration of an ortho salt or acid effects an atomic rearrangement within the phosphate molecule. For example, sodium pyrophosphate $Na_4P_2O_7$ may be considered as derived from disodium monohydrogen orthophosphate by the removal of water of constitution, and sodium metaphosphate $NaPO_3$ may be considered as derived from monosodium dihydrogen orthophosphate by the removal of water of constitution. In addition to the pyrophosphate and metaphosphate, there is a sodium tripolyphosphate of the formula $Na_5P_3O_{10}$, which may be similarly considered as derived by dehydration of a mixture of orthophosphates which is intermediate in acidity between the dihydrogen and the monohydrogen orthophosphates.

Although the invention is particularly aplicable to preventing the precipitation of calcium sulphate in sulphuric acid baths used for carbonizing wool, it is applicable also to other processes. For example, the invention is useful in evaporating salt solutions. The process of evaporating salt solutions, that is solutions of sodium chloride, or other simple or complex brine solutions, sometimes leads to the deposition of calcium sulphate as the salt brine becomes more and more concentrated. It is likewise probable that calcium carbonate is deposited from a salt brine as a result of the heat applied and the concentration which takes place. The deposition of these calcium salts may be prevented or retarded by adding sodium metaphosphate to the solutions in the relatively small amounts hereinbefore mentioned. Applications of the general process may readily be made to many processes where the precipitation of metallic salts occur.

While I have specifically described the preferred embodiment of my invention and have given certain specific examples, it is to be understood that the invention is not so limited but may be otherwise embodied or practiced within the scope of the following claims.

I claim:

1. The process of preventing the precipitation of calcium sulphate in sulphuric acid baths used for carbonizing wool, which comprises adding to the bath sodium metaphosphate in substantially less than the stoichiometric amount which would be required to react with the excess of calcium above the calcium kept in solution by the sulphuric acid itself.

2. The process of preventing the precipitation of calcium sulphate in sulphuric acid baths used for carbonizing wool, which comprises adding to the bath sodium metaphosphate in only a small fraction of the amount which would be required to act stoichiometrically with the excess calcium in the bath above the calcium kept in solution by the sulphuric acid itself.

3. The process of preventing the precipitation of calcium sulphate in sulphuric acid baths used for carbonizing wool, which comprises adding to the bath about 50 to 1,000 P. P. M. of sodium metaphosphate.

4. The process of preventing the precipitation of calcium sulphate in sulphuric acid baths used for carbonizing wool, which comprises adding to the bath about 50 to 400 P. P. M. of sodium metaphosphate.

5. The process of preventing the precipitation of sulphates from sulphuric acid solutions, which comprises adding to the solution sodium metaphosphate in substantially less than the stoichiometric amount which would be required to react with the excess of sulphate forming metal above the amount of said metal kept in solution by the sulphuric acid itself.

6. The process of preventing the precipitation of sulphates of the alkaline earth metals and lead from sulphuric acid solutions, which comprises adding to the solution sodium metaphosphate in substantially less than the stoichiometric amount which would be required to react with the excess of sulphate forming metals above the amount of said metals kept in solution by the sulphuric acid itself.

7. A carbonizing bath adapted for use in carbonizing wool, which comprises a dilute solution of sulphuric acid and containing in addition an alkali metal metaphosphate in an amount substantially less than that required for it to react stoichiometrically with the excess calcium in the bath above the calcium kept in solution by the sulphuric acid itself.

EDWARD B. BELL.